C. CLEMENS.
FEEDING DEVICE FOR CHOCOLATE MOLDING MACHINES.
APPLICATION FILED JUNE 26, 1912.
1,152,789.
Patented Sept. 7, 1915.
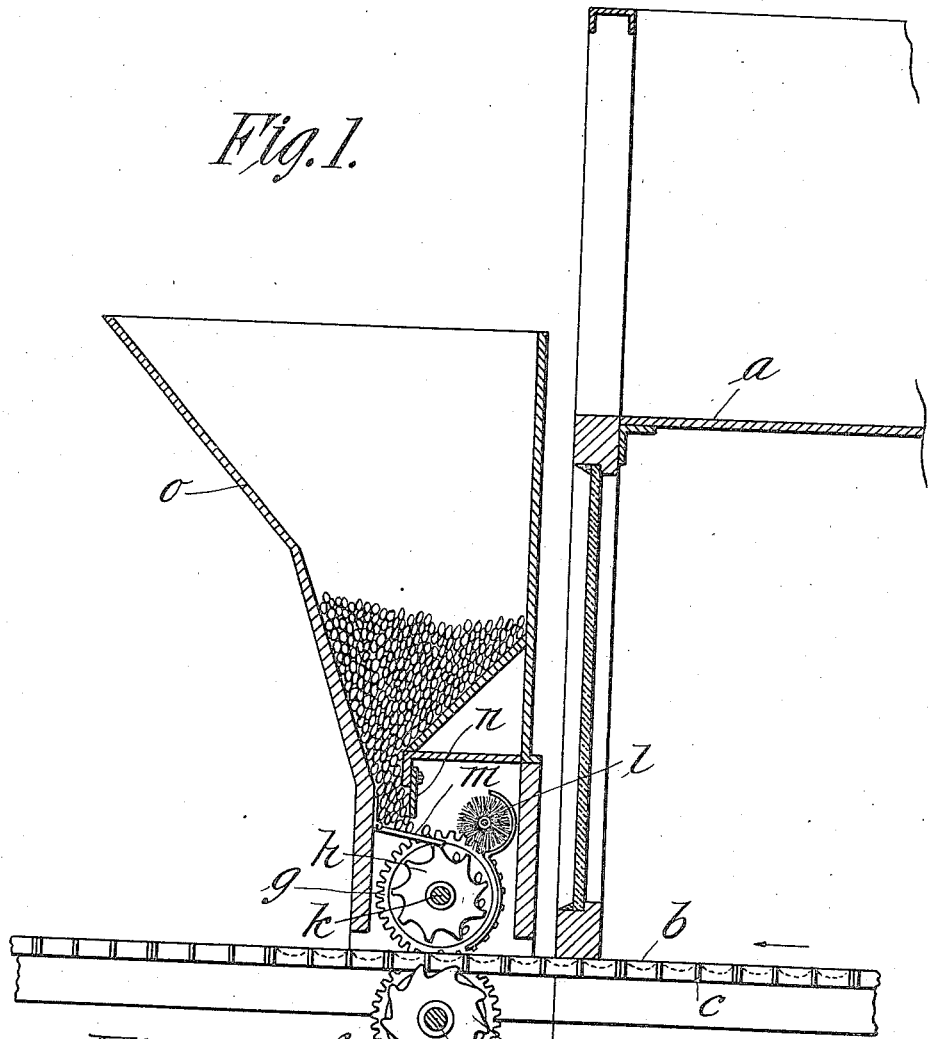
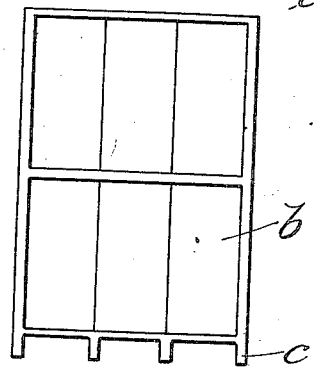
WITNESSES:
E. M. Beale.
P. M. Mowry.
INVENTOR,
Charles Clemens,
BY
Chapin + Co.
ATTORNEYS

UNITED STATES PATENT OFFICE.

CHARLES CLEMENS, OF EAST LONG MEADOW, MASSACHUSETTS, ASSIGNOR TO NATIONAL EQUIPMENT COMPANY, OF SPRINGFIELD, MASSACHUSETTS, A CORPORATION OF MASSACHUSETTS.

FEEDING DEVICE FOR CHOCOLATE-MOLDING MACHINES.

1,152,789.

Specification of Letters Patent. Patented Sept. 7, 1915.

Application filed June 26, 1912. Serial No. 705,942.

*To all whom it may concern:*

Be it known that I, CHARLES CLEMENS, a citizen of the United States of America, residing at East Long Meadow, in the county of Hampden and State of Massachusetts, have invented new and useful Improvements in Feeding Devices for Chocolate-Molding Machines, of which the following is a specification.

This invention relates to a molding machine, such as is disclosed in the Letters Patent of the United States No. 1,110,404, granted Sept. 15, 1914, to E. A. L. Savy, which is used in molding chocolate bars that may contain almonds or other hard bodies therein.

The object of the invention is to provide mechanism which will automatically and accurately feed almonds, or other articles, to the molds as the latter pass through the machine.

With this object in view, the feeding device is designed to be operated by the movement of the mold to be fed as that movement places the mold in feeding position.

Other objects of the invention will appear in the detailed description and the annexed claims.

In the drawings forming part of this application,—Figure 1 is a cross sectional detailed view showing the essential features of the invention. Fig. 2 is a plan view showing a mold suitable for use in the invention.

Referring to the drawings, $a$, Fig. 1, represents a molding chamber which is usually kept at a constant temperature and which contains suitable apparatus for filling the molds passing therethrough with chocolate or other desired substances. The molds pass through the molding chamber and then out onto a shaking table, and other apparatus not shown. Either before the molds enter the molding chamber, or after they leave it, it is customary to feed hard bodies to the chocolate in the molds by various means: for instance, a hopper is mounted above the travel of the molds with a feed-wheel located at the mouth thereof to control the flow of the almonds, or other bodies to the molds.

In the past, one manner of operating the feed-wheel has been to connect the shaft of this feed-wheel with a toothed wheel, the teeth of which enter the hollows in the molds as they pass through the machine. This toothed wheel is thus turned by the travel of the molds through the machine, and a chain or belt connection to the feed-wheel shaft from the toothed wheel operates the latter in a time relation to the travel of the molds. This method has proved satisfactory in many instances, but it will be seen that as the molds are first fed to the machine, the toothed wheel will start to operate before the molds reach the position to receive the almonds from the feed-wheel.

In case of any interruption in the operation of the molding machine, as a whole, or in the order in which the molds should be fed through the machine, almonds or other hard bodies, by the former methods of feeding used, have been fed at a time when no molds were positioned to receive the feed. This has frequently caused trouble and delay in operating the machine.

By applicant's method, the feed-wheel is operated to feed to any one mold directly by that one mold which is to receive the quantity of hard bodies, or other substance, from the feed-wheel. In accordance with this method, the preferred arrangement operates as indicated in Fig. 1. A large quantity of almonds are contained in the hopper $o$ and constantly tend to leave the outlet but are controlled from so doing by the flap-valve $m$ pivoted to the side of the hopper; an adjusting plate $n$ coöperates with this valve to control the size of the opening through which the bodies pass.

A feed-wheel $h$, with a series of peripheral pockets therein, is mounted below the outlet of the hopper on the shaft $k$ and as the latter is rotated in a manner to be described, the feed-wheel, through its peripheral projections, will jog the valve $m$ up and down thus stirring the almonds at the outlet of the hopper to create a free flow therefrom. A brush $l$ is mounted to rotate, as shown, and operates to brush the excess almonds fed to one peripheral pocket of the feed-wheel back to the following pocket. Keyed to the shaft $k$ is a gear $g$ which meshes with another gear $f$ mounted on the shaft $d$. The gears $g$ and $f$ are preferably of the same dimensions for a purpose to be described. On the shaft $d$ is a toothed wheel $e$ which is arranged to lie at one side of the molds, as the latter travel through the machine. On each mold, as indicated in Fig. 2, there are placed lugs c, one for each compartment in the mold,—or, as shown, one for each series of cross compartments, it being understood that the feed-wheel h is designed to feed the almonds properly to the compartments of the molds as the latter pass thereunder. As the molds pass through the machine (moved in any suitable manner and under the feed-wheel h) a lug c on each mold or compartment thereof, will engage one of the teeth of the wheel e and turn the latter a distance equal to one tooth. By the mechanism described and shown, it is seen that this movement of the wheel e will cause a corresponding movement of the feed-wheel h a distance sufficient to empty one peripheral pocket of the feed-wheel. It will be seen from the position of the mold which has just moved the toothed wheel e, that the feed from the peripheral pocket will be directly into the proper compartment of the mold,—the lug of which caused the feeding movement.

From the mechanism described, it is seen that as the molds move through the machine, each compartment is properly fed due to the fact that the feed-wheel is moved just the right distance at just the right time; that is, the feed-wheel is moved to feed an amount sufficient for one compartment by the movement of that compartment, at the time the compartment to receive that amount is directly under the pocket which is feeding it. The movement of the feeding pocket is directly controlled by the movement of the compartment to be fed to the position stated.
It is impossible to feed almonds out of the feed-wheel unless there is a mold thereunder to receive the quantity fed, thus saving any false operation of the almond-feeding device.
While applicant has described a specific and preferred mechanism to obtain the results desired, it is apparent that various specific mechanisms could be designed to obtain the same results without departing from the essential features of the invention.

What I claim, is:—

1. The combination in a molding machine of a series of trays arranged to travel through the machine each having molds formed therein, a movable feeding device arranged above the travel of the trays to feed articles to each mold, lugs on each tray one for each mold, together with mechanism operable from said lugs by movement of the tray to move said feeding device and thereby feed an article to a mold.

2. The combination in a molding machine of a series of trays arranged to travel through the machine, a plurality of molds formed in said trays, a container arranged above the travel of said trays for articles to be fed to said molds, a movable device arranged at the mouth of said container to receive a measured quantity of articles from said container and to transfer the same to a mold, together with mechanism to operate said device, said mechanism arranged to operate by the movement of the tray containing the mold to be filled.

3. The combination, in a mold filling machine, with a receptacle to contain articles to be fed to the mold of an opening formed in said receptacle, a movable gate to vary the size of said opening to permit articles to pass therethrough, a feed wheel having its periphery formed to receive said articles as they are delivered from the receptacle, means operable from the feed wheel to control the movable gate, the mold to be filled having a projection formed thereon, a toothed wheel operated by the projection when the mold is in registration with the discharging position of the feed-wheel, and connecting mechanism between the toothed-wheel and the feed wheel, whereby the feed wheel is actuated from the mold.

CHARLES CLEMENS.

Witnesses:
 WALTER F. WALKER,
 IRVING R. LYON.